United States Patent Office 2,743,283
Patented Apr. 24, 1956

2,743,283

NOVEL 3-SUBSTITUTED 4-HYDROXYCOUMARINS AND THEIR PROCESS OF PREPARATION

Kurt Wilhelm Knoevenagel, Kleinkarlbach, Rheinpfalz, Germany, assignor to Norddeutsch Affinerie, Hamburg, Germany, a corporation of Germany, and C. F. Spiess & Sohn, Kleinkarlbach, Rheinpfalz, Germany, a firm No Drawing. Application August 23, 1954,
Serial No. 451,673

6 Claims. (Cl. 260—343.2)

The present invention relates to novel 3-substituted 4-hydroxycoumarins and their process of preparation.

3-substituted 4-hydroxycoumarins of various types have already been prepared by condensing 4-hydroxycoumarins with certain unsaturated ketones in a Michael-type reaction.

It now has been found that substituted ketoesters of the following general formula

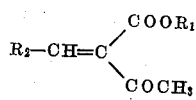

in which $R_1$ represents a methyl or ethyl group and $R_2$ represents a lower alkyl group or a phenyl group will react with 4-hydroxycoumarin in a Michael-type reaction to produce new 3-substituted 4-hydroxycoumarins having useful properties.

The new 3-substituted 4-hydroxycoumarins which are obtained in this manner have the following general formula:

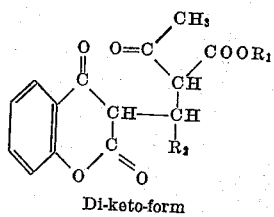

Di-keto-form in which $R_1$ represents a methyl or ethyl group and $R_2$ represents an alkyl group, phenyl group or substituted phenyl group. By a keto-enol transformation these 3-substituted 4-hydroxycoumarins may in part exist in the corresponding two keto-enolforms and in the corresponding di-enolform which have the following formulae:

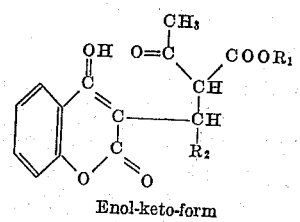

Enol-keto-form

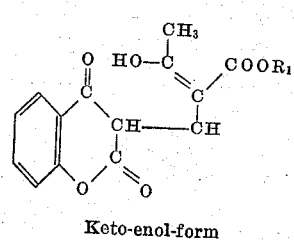

Keto-enol-form

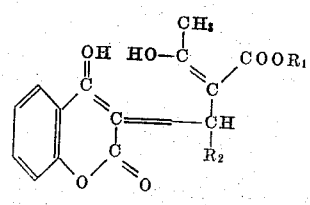

Di-enol-form

For the sake of simplicity, only the formula for the di-ketoform will be used in this application but it is intended that the other three formulae mentioned above also be included. Our new 3-substituted 4-hydroxycoumarins can be produced by a Michael-type addition reaction represented by the following equation:

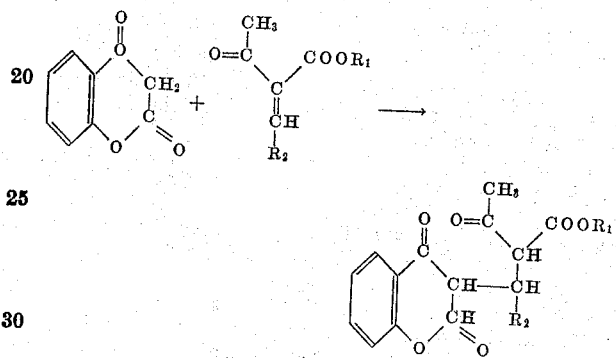

The reaction can be carried out by refluxing the reactants in an inert solvent or by melting the reactants together. It is advantageous to use a small amount of an alkaline substance, such as, for instance, pyridine or alkalimetal-alcoholate or sodiumphosphate or potassiumphosphate as catalysts. It is also advantageous to carry out the reaction with heating as, for instance, by refluxing the reactants in an inert solvent. It is also advantageous to reflux the 4-hydroxycoumarin in the solvent used and adding the unsaturated ketoester over a certain period of time through the reflux-condenser into the solvent containing the 4-hydroxycoumarin. Preferably, equal molecular amounts of the reactants are used but a small excess of the 4-hydroxycoumarin can also be used. The reactants are refluxed with the solvent for about 1–6 hours. After refluxing the solvent is removed by distillation or separation. The residue is washed with water and recrystallized from toluol or acetone-water.

The new 3-substituted 4-hydroxycoumarins are suitable to lower the capillary resistance when mixed with a bait in a concentration of 0.01 to 0.03% and fed to animals.

Example 1

10 g. benzalethylacetoacetate were refluxed for 4 hours with 7.4 g. 4-hydroxycoumarin and 0.5 g. sodiumphosphate in 150 ccm. water. After cooling the solid product was recovered by filtration and was recrystallized from a mixture of 3 parts acetone with 1 part water. The α - acetyl - β - phenyl - β′ - hydroxycoumarinyl - propionate was obtained in the form of white crystals with a melting point of 149–151° C. It is soluble in acetone and substantially insoluble in cold water; and dissolves in alkaline solutions with formation of the corresponding salt. The yield is about 25%.

19.94 ccm. n/10 NaOH were required for titration 0.760 g. of the substance (calculated 20.00 ccm.). Analysis of the final product indicated the formula $C_{22}H_{20}O_6$;

Carbon: Calculated, 69.46%; found, 69.42%.
Hydrogen: Calculated, 5.30%; found, 5.33%.

Upon recrystallization from toluol or benzene in the presence of water the compound was recovered as a hydrate with the following formula:

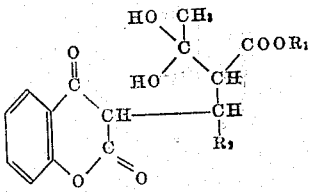

The hydrate is a light yellow solid substance which melts at 114–116° C. The hydrate is soluble in acetone and substantially insoluble in cold water and is soluble in dilute alkalies to form solutions of the corresponding salt.

20.00 ccm. of n/10 NaOH are required for titration 0.796 g. of the substance (calculated 20.00 ccm.). Analysis of the hydrate form indicated the formula $C_{22}H_{22}O_7$ Carbon: Calculated, 66.30%; found, 66.62%.
Hydrogen: Calculated, 6.03%; found, 5.59%.

When the hydrate was recrystallized from acetone-water the free substance with the melting point of 149–151° C. was obtained again.

The $\alpha$ - acetyl - $\beta$ - phenyl - $\beta'$ - hydroxycoumarinyl-ethylpropionate, as well as the hydrate, is saponified upon refluxing in alkaline solutions and with formation of the 3(1-phenyl-2-acetyl)-ethyl-4-hydroxycoumarin which can be isolated with a melting point of 162° C.

Example 2

26.5 g. 4-hydroxycoumarin and 2 g. sodiumphosphate were refluxed with 70 g. dioxane. During a period of 4 hours 34.7 g. benzalethylacetoacetate dissolved in 30 g. dioxane were dropped in to the mixture. The reaction-mixture was refluxed for a further ½ hour. Then 1.8 g. $P_2O_5$ were added and the dioxane was distilled off under reduced pressure. The residue was washed several times with water and recrystallized from toluol. A solid white substance was obtained, which could be, if necessary, recrystallized from acetone-water. Melting point 151° C., yield 55%.

Example 3

26.5 g. 4-hydroxycoumarin and 2 g. pyridine were refluxed with 70 g. dioxane. During a period of 4 hours 34.7 g. benzalethylacetoacetate dissolved in 30 g. dioxane were dropped into the mixture. The reaction-mixture was refluxed for a further ½ hour. Then 1.8 g. $P_2O_5$ were added and the dioxane was distilled off under reduced pressure. The residue was washed with water several times and recrystallized from toluol. A solid white substance was obtained, which could be, if necessary, recrystallized from acetone-water. Melting point 149° C., yield 35%.

Example 4

26.5 g. 4-hydroxycoumarin and 2 g. potassiumphosphate were refluxed with 70 g. dioxane. During a period of 4 hours 34.7 g. benzalethylacetoacetate dissolved in 30 g. dioxane were dropped into the mixture. The reaction-mixture was refluxed for a further ½ hour. Then 1.8 g. $P_2O_5$ were added and the dioxane was distilled off under reduced pressure. The residue was washed with water several times and recrystallized from acetone-water. Product and yield about the same as in Example 2.

Example 5

128 g. 4-hydroxycoumarin and 5 g. sodiumphosphate were refluxed with 100 ccm. toluol. During a period of 3½ hours 150 g. benzalethylacetoacetate which were dissolved in 50 ccm. toluol were dropped in. After refluxing for another ½ hour the hot solution was filtered. After cooling a light-yellow solid substance was separated by filtration. The product was washed several times with toluol and, if necessary, recrystallized from acetone-water. The yield was about 35%. The product melted at about 150° C.

Example 6

128 g. 4-hydroxycoumarin, 150 g. benzalethylacetoacetate and 5 g. sodiumphosphate were melted for 1½ hours at 140° C. while stirring. The hot residue was dissolved in hot toluol and filtered. After cooling the light-yellow solid substance was separated by filtration and was recrystallized from acetone-water. The yield was about 26%. The product melted at about 149° C.

I claim:
1. A 3-substituted 4-hydroxycoumarin of the general formula

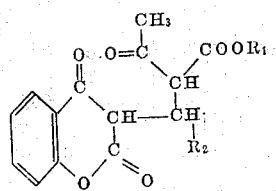

in which $R_1$ is a lower unsubstituted alkyl group and $R_2$ is a phenyl group.

2. A 3-substituted 4-hydroxycoumarin in accordance with claim 1 in which $R_1$ is ethyl.

3. A 3-substituted 4-hydroxycoumarin-hydrate of the general formula

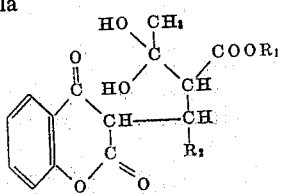

in which $R_1$ represents a lower unsubstituted alkyl group and $R_2$ a phenyl group.

4. A 3-substituted 4-hydroxycoumarin in accordance with claim 3 in which $R_1$ is ethyl.

5. A process of producing 3-substituted 4-hydroxycoumarins of the following general formula:

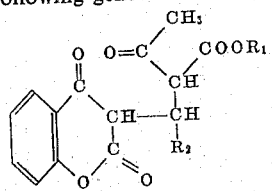

in which $R_1$ is a lower unsubstituted alkyl group and $R_2$ a phenyl group which consists in condensing 4-hydroxycoumarin with a substituted $\beta$ ketoester of the following general formula:

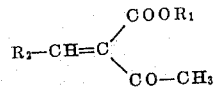

in which $R_1$ and $R_2$ have the same meaning as above.

6. A process of producing 3-substituted 4-hydroxycoumarins as set forth in claim 5 in which $R_1$ is ethyl.

References Cited in the file of this patent

UNITED STATES PATENTS

| | | |
|---|---|---|
| 2,427,578 | Stahmann et al. | Sept. 16, 1947 |

FOREIGN PATENTS

| | | |
|---|---|---|
| 568,858 | Great Britain | Apr. 24, 1945 |
| 884,500 | Germany | July 27, 1953 |

OTHER REFERENCES

Mohlo et al.: Compt. rendu, vol. 223, pp. 1141–42 (1946).

Trenknerowna, Chem. Abst., vol. 31, p. 2187 (1937).